United States Patent Office 3,103,584
Patented Sept. 10, 1963

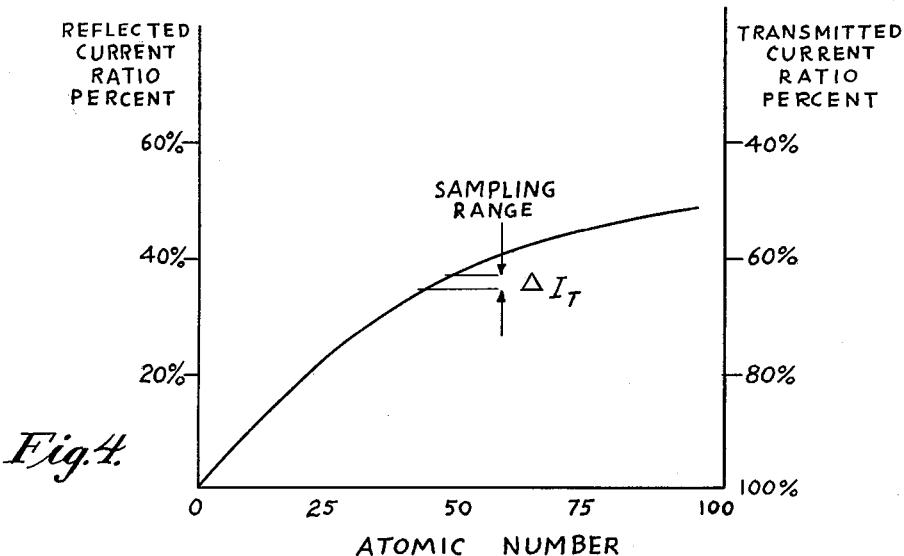
Fig. 4.
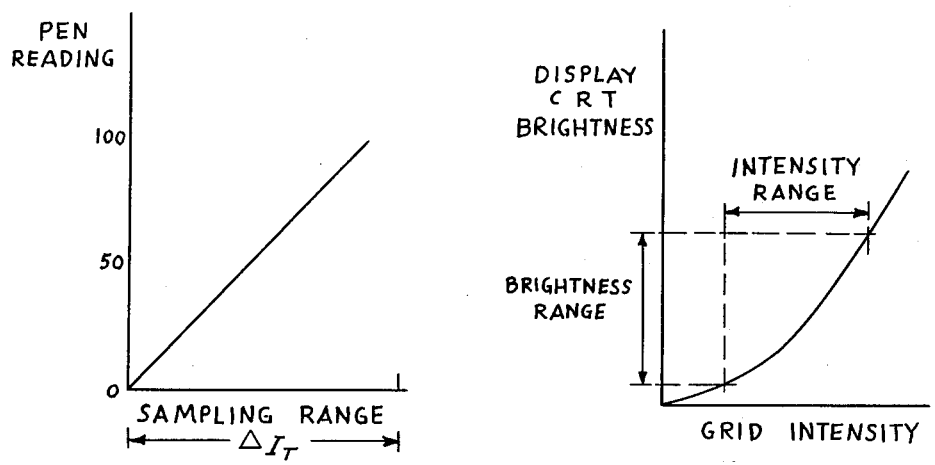
Fig. 5.
Fig. 6.

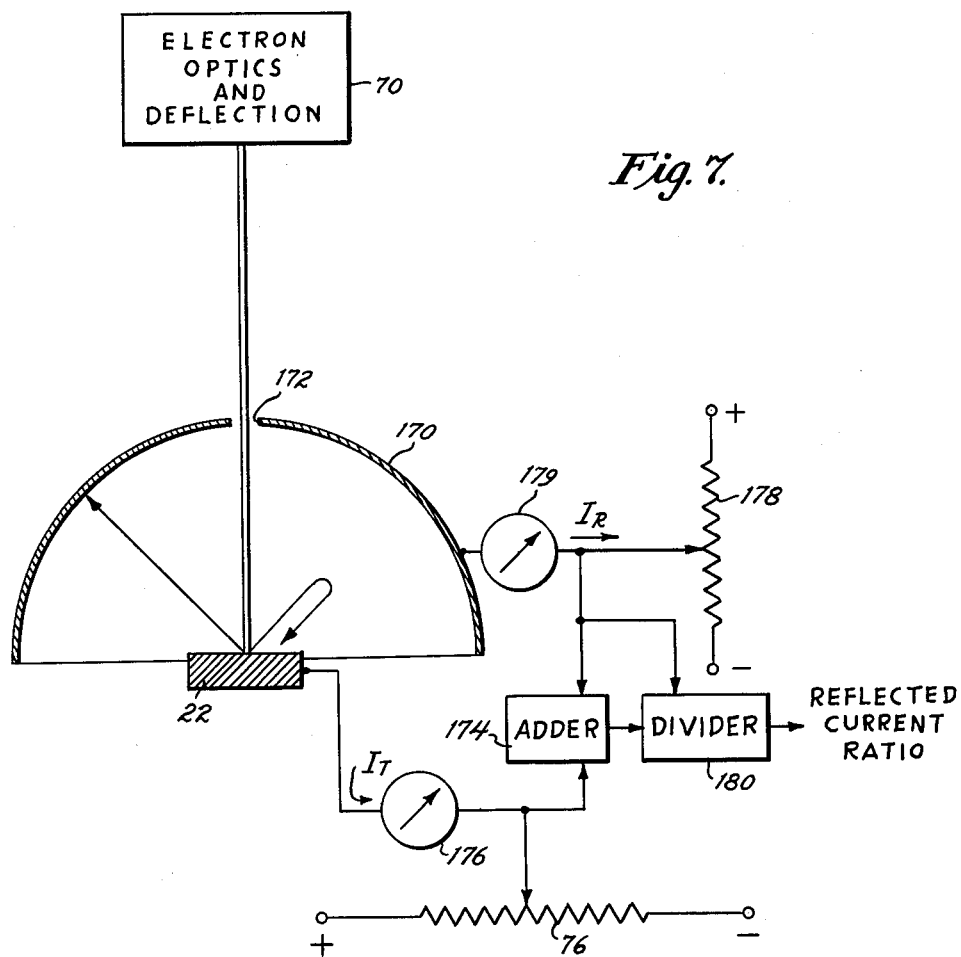

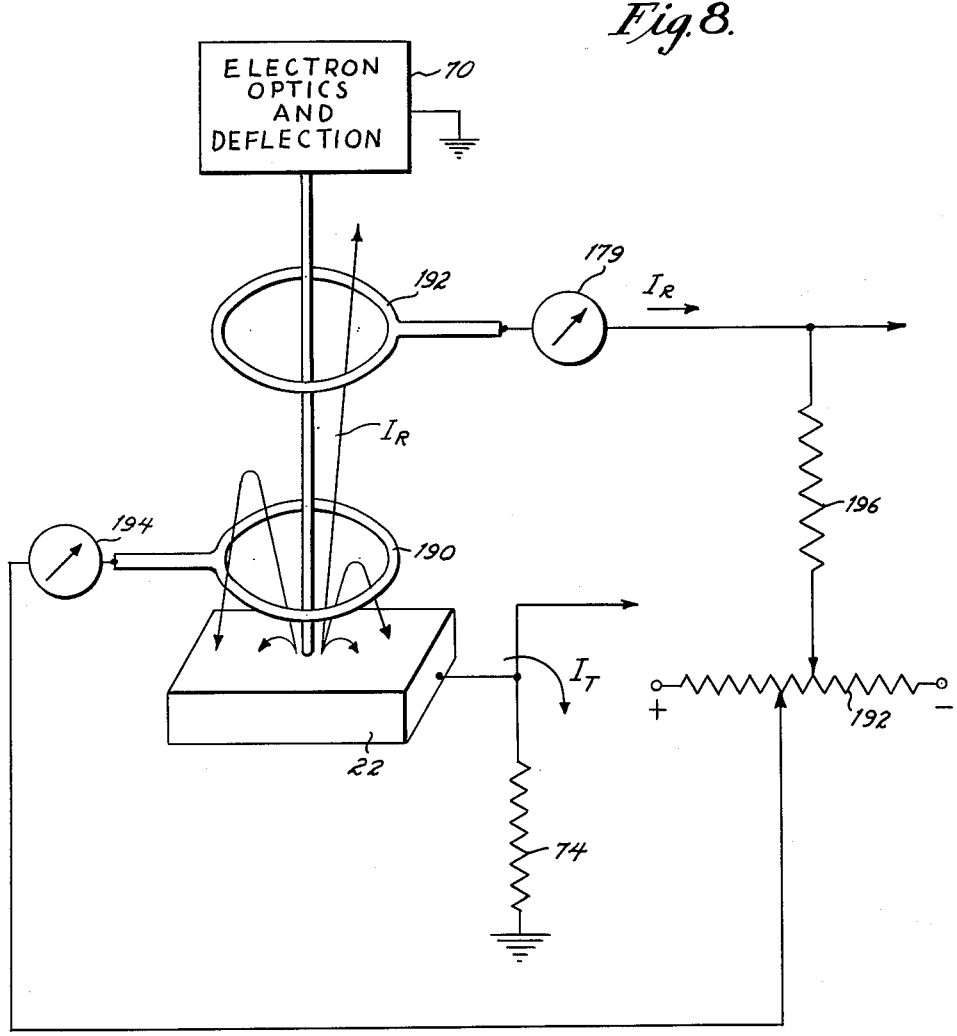

3,103,584
ELECTRON MICROANALYZER SYSTEM
Louis Shapiro, Erlton, N.J., and Robert E. Ogilvie, Lexington, Mass., assignors to Elion Instruments, Inc., a corporation of Pennsylvania
Filed Aug. 7, 1961, Ser. No. 129,875
22 Claims. (Cl. 250—49.5)

This invention relates to electron beam probe systems suitable for electron microanalysis. In particular, this invention relates to a system for measuring the atomic number of a specimen.

In a copending patent application of Louis Shapiro, "Electron Probe System," filed March 2, 1961, Serial No. 92,889, an electron beam probe system is described which is especially adapted for X-ray microanalysis. With this system, a specimen is irradiated in a microscopic area by means of a beam of electrons to stimulate the emission of X-rays. The emitted X-rays are analyzed by means of a spectrometer in order to determine the characteristics of the specimen from which they were emitted. With the techniques of electron optics the electron beam can be directed as a stationary probe to an area of one micron and less, and can be deflected to analyze minutely the variations in composition occurring from point to point in a specimen. By electronic deflection of the electron beam, scanning techniques are made available to display an image of the X-ray emission over a substantial area of the specimen. In addition, the scanning techniques permit the development of an electron display image as in scanning electron microscopy at the same time that the X-ray image is being developed.

The phenomenon of electrons emitted from a surface that is exposed to electron bombardment and an atomic number relationship is well-known; see, for example, "An Improved Scanning Electron Microscope for Opaque Specimens," by D. McMullan, Proc. I.E.E. (Brit.) 1953, vol. 100 (II), pages 245–249, and "Backscattering of 5–20 kev. Electrons from Insulators and Metals," by Holliday et al., J. App. Phys., vol. 28, 1957, pages 1189–1193. Electrons emitted by a surface exposed to a high energy electron beam include so-called secondary electrons. These are usually considered as not originating in the original electron beam, but rather are the result of obtaining enough energy to leave the surface of a specimen due to the spread of general excitation in the neighborhood of the impact of primary beam electrons. Most of the secondary electrons have energies of only a few electron volts; but they may have upper limits to as high as 300 e.v. or higher. The emitted electrons also include reflected primary electrons which retain all or most (say, 75%) of the original beam energy. In addition, emitted electrons include so-called re-diffused electrons from the primary beam which have energy levels falling between those of the above-described reflected and secondary electrons. The re-diffused electrons may be due to inelastic collisions or near misses in the specimen.

The ratio of the relative number of electrons in each of the above three categories to the total number of electrons in the original beam varies with the angle of impact of this beam as well as with the roughness of the specimen surface. In certain instances it may vary with electron velocity or energy. If the axis of the beam is orthogonal to the surface of the specimen, and the specimen surface is polished to a high degree of smoothness, there are essentially no variations in surface topography to influence emission mechanisms of this type outlined above. With low energy beams, there may be principally only secondary electrons present, and as the energy of the beam is increased, greater numbers of reflected primary electrons and re-diffused electrons appear. Conversely, with a high energy beam there may be a decrease in secondary electrons, apparently due to the fact that more beam electrons penetrate into the interior of the specimen before suffering collisions or otherwise giving up energy. For a wide range of energies normally used in this type of microanalysis, however, there is substantially no effect of electron velocity on the ratio of reflected electrons to the total number of electrons. It is known, however, that the number of reflected electrons tends to vary as a function of the atomic number of the specimen that is irradiated with the electron beam.

It is an object of this invention to provide a new and improved system for analyzing specimens with an electron beam probe.

Another object is to provide a new and improved electron beam analyzing system for determining the atomic number of specimens.

Another object is to provide a new and improved electron beam system for determining the atomic number of specimens with precision, accuracy, and reliability.

In accordance with an embodiment of this invention, an electron beam analysis system includes means for directing an electron beam to a specimen, means for biasing the specimen and for deriving a signal in accordance with the specimen current produced by the electron beam, and means for producing from the derived signal another signal proportional to the ratio of the reflected electron current to the electron beam current. In accordance with one embodiment of the invention, the ratio signal is produced by also deriving a signal proportional to the reflected electron current and dividing the reflected electron signal by the sum of the reflected and specimen currents signals. In accordance with another embodiment of this invention, the ratio signal is produced by modifying the derived specimen current signal appropriately so as to derive a signal essentially proportional to the ratio of reflected electron current and beam current.

In an embodiment of this invention, means are provided for selectively expanding a portion of the scale of measurement of the ratio signals to obtain precision. The ratio signals are suitable for display, recording, and image reproduction.

The foregoing and other objects of this invention, the features thereof as well as the invention itself, may be more fully understood from the following description when read together with the accompanying drawing, in which:

FIG. 4 is an idealized graph of the relationship of atomic number of a specimen and the reflected current ratio derived with an electron beam system such as that shown in FIG. 2;

FIG. 5 is an idealized graph of a portion of the graph of FIG. 4 with different coordinates;

FIG. 6 is an idealized graph of a portion of a graph of FIG. 4 with different coordinates;

FIG. 7 is a schematic system and circuit diagram of a modification of the system of FIGS. 1 and 2; and FIG. 8 is a schematic system and circuit diagram of another modification of the system of FIGS. 1 and 2.

In the drawing corresponding parts are referenced by similar numerals throughout.

Figure 1:
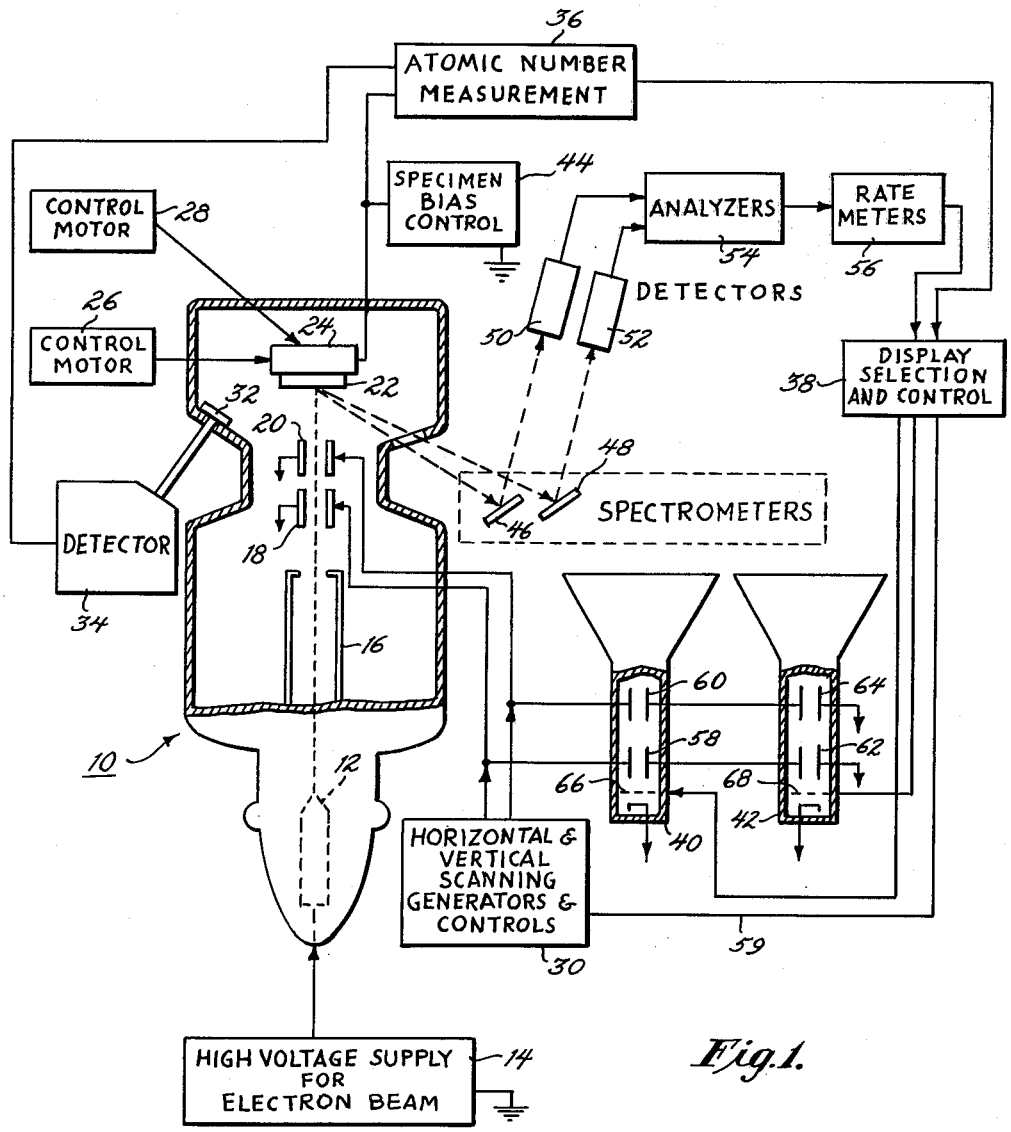
FIG. 1 is a schematic block diagram of an electron microanalyzer system incorporating this invention.

In FIG. 1 a generalized block diagram of the scanning system of this invention is shown. The electron probe is formed as an electron beam in a column 10 that is oriented vertically. The beam is emitted from a filament 12 which is energized by a suitable adjustable high voltage supply 14 adapted to supply a maximum of about 50 kilovolts. The electron beam is formed by suitable electron optics 16. The electron beam passes through two sets of deflection plates 18 and 20 which respectively deflect the beam in transverse directions. The beam is directed to a specimen 22 supported on a specimen stage 24 which is adapted to be moved in transverse directions by separate control motors 26 and 28. The stage 24 is also adapted to be moved axially along the column 10 by another control motor (not shown).

The deflection plates 18 and 20 are separately energized by horizontal and vertical scanning generators shown generally by the block 30. The scanning raster may be of the order of two millimeters square, and the specimen may be many times that in area. The control motors 26 and 28 move the specimen 22 to different positions so that different areas of that specimen may be scanned by the electron beam.

High velocity electrons reflected from the specimen 22 are directed to a phosphor element 32 at the side of the column, and the light emitted from the phosphor is directed to a detector 34 which may be a photomultiplier. The electrical signal derived as an output from the detector 34 is characteristic of an electron image of the specimen 22, and this output is supplied via an atomic number measuring system 36 and a control system 38 to one or the other of two display tubes 40 and 42. A voltage bias is applied to the specimen 22 by a bias control 44, and the specimen current is used by itself or with the reflected electron signal in the atomic number measuring system 36 to derive characteristic signals that may be selectively displayed via the control 38 on the display tubes 40 and 42.

Some of the electrons irradiating the specimen 22 penetrate that specimen and excite the emission of X-rays. These X-rays are directed to spectrometer crystals 46 and 48 and reflected to separate detectors 50 and 52, such as scintillation or Geiger-Müller counters. The outputs of the detectors 50 and 52 may be in the form of pulses and are supplied to scalers or analyzers 54 (such as pulse height analyzers), the outputs of which are transmitted via rate meters 56 to the control 38 for selecting the display on the tubes 40 and 42. Suitable arrangements for deriving appropriate electrical signals from the X-ray emission are well-known. Pen recorders (not shown) may be provided for charting these signals in addition to using them in the image display of tubes 40 and 42.

The display tubes 40 and 42 have deflection systems 58, 60 and 62, 64 respectively, which are deflected in synchronism with each other and with the deflection plates 18 and 20 of the column 10 by the scanning generators 30. The terms "horizontal" and "vertical" are used to refer conveniently to the usual transverse orientations of the scanning in a display tube; but no restriction as to actual positions of use is intended thereby.

In operation, electron images of the specimen being scanned are provided by the reflected electron currents and by the specimen currents, one of which may be selected for imaging on a display tube 40 or 42, or one or both of which may be used to derive signals representative of the atomic number of the specimen. In addition, an X-ray image of the specimen is represented by signals from the spectrometers 46 and 48 and the detectors 50 and 52. These various image signals may be selected via the control 38 and displayed by intensity modulation of the display tubes 40 and 42 via their grids 66 and 68. For example, one of the tubes may display an electron image and the other, an X-ray image, or different kinds of X-ray images may be displayed by the two tubes 40 and 42. Various other arrangements for displaying information about the specimen 22 are set forth in the aforementioned copending application. For example, the signals to be displayed may be applied via a connection 59 to the scanning generator control 30 for deflection of the display tube beam. Thereby, deflection of its beam is proportional to the signals applied so that one or the other of the display tubes 40, 42 may be used to indicate such measurements of the characteristics of the specimen 22 as well as the images thereof.

Figure 2:
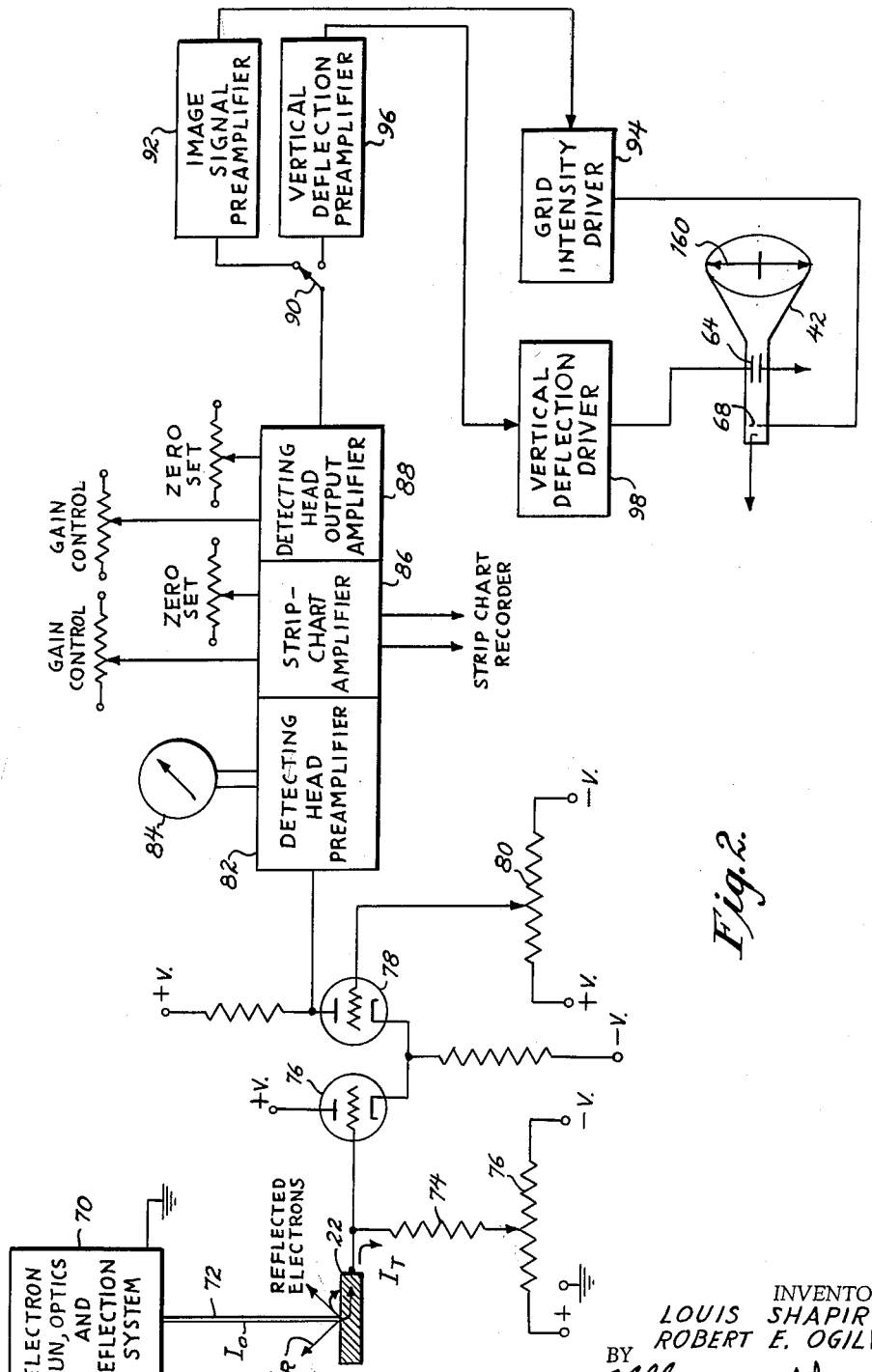
FIG. 2 is a schematic circuit and block diagram of portions of the system of FIG. 1.

In FIG. 2 the electron gun, electron optics, and deflection system are shown for simplicity as a single block 70. The electron beam 72 is directed to the specimen 22, which, in turn, is connected via a sampling resistor 74 to a potentiometer 76. The potentiometer 76 provides an adjustable bias for the specimen 22 over a range from positive to negative voltages relative to the ground potential to which the electron gun 70 is returned. The voltage developed across the sampling resistor 74 is connected to the first input 76 of a differential amplifier, the other input 78 of which is connected to a potentiometer 80. The output of the differential amplifier is connected to a detecting head preamplifier 82 which drives a meter 84, and also to amplifiers 86 and 88 respectively used for strip chart recorder and for a cathode ray tube display. The amplifiers 86 and 88 each have individual gain control and zero-set adjustments for a purpose which will be hereinafter described. The output of the C.R.T. amplifier 88 is connected via a switch 90 to an image signal preamplifier 92, which, turn, supplies a grid intensity signal to a driver 94 which drives the grid 68 of the display tube 42. Alternatively, the switch 90 is connected to a vertical deflection preamplifier 96 which supplies deflection signals to a driver 98 for the vertical deflection plate 64 of the display tube 42; under which circumstances, the tube 42 operates as a display oscilloscope.

In normal operation, the bias supplied by the potentiometer 76 is at a high positive level, for example, about 250 volts positive with respect to ground. With this large positive bias, all of the emitted electrons of relatively low energy (namely, the secondary and many re-diffused electrons) are attracted back to the specimen 22. With a sufficiently large positive bias, only true reflected electrons have sufficient energy to break free of the positive electrical field of the specimen 22. When secondary and re-diffused electrons do not escape from the specimen 22, then only the primary reflected electrons immediately at the area of beam impingement on the specimen are reflected, and only these reflected electrons contribue to the value of specimen current sampled through the resistor 74. (For practical purposes, a negative range of specimen bias is available should the repulsion of secondary electrons be desired for various tests and experimental purposes; likewise, lower positive bias voltages are provided by adjustment of the potentiometer 76 for such purposes.)

The total beam current $I_0$ is stabilized by stabilizing the electrical parameters of the power supply and other parts of the system, and by ensuring a stable electron-optical system, electrically and mechanically so that the beam cross-section is unvarying. Consequently, the beam current can be considered to be a constant value equal to the sum of the reflected electron current $I_R$ and the electron current $I_T$ transmitted within the specimen. A voltage proportional to the specimen current is developed across the sampling resistor 74 and amplified in the difference amplifier 76, 78. The potentiometer 80 provides a zero setting for the meter 84, and the preamplifier 82 provides additional gain for this sampled voltage. With appropriate direct current (D.-C.) level setting, the meter 84 provides readings which may be calibrated in terms of atomic number Z. As indicated above, the atomic number of the specimen is related to the ratio of reflected to total beam current (or to the percent of reflected electron current) as follows:

$$\text{Reflected current ratio} = \frac{I_R}{I_0} = K_0 I_R$$
$$= K_0(I_0 - I_T)$$
$$= K_0 I_0 - K_0 I_T$$

where $$K_0 = \frac{1}{I_0}$$

The constant $K_0I_0$ is effectively provided by the meter zero setting supplied by potentiometer 80. For a maximum value of $I_T$ (corresponding to $I_T=I_0$), the meter reading is arranged to be zero consistent with the above equation; and for a minimum value of $I_T$ (corresponding to a maximum reflected current and atomic number), the meter is arranged to read full scale. The intermediate values are registered in a consistent fashion. The relationship of reflected current ratio and atomic number is a non-linear one as shown in FIG. 4. Therefore, the meter calibration is also non-linear to compensate for this non-linear relationship; or alternatively, a non-linear compensating circuit is provided in the preamplifier 82 to convert the specimen current signal to one linearly related to atomic number. Suitable diode circuits for generating non-linear functions are available for this purpose.

Further amplification provided by the amplifier 88 together with proper zero settings produce signals representative of atomic number which may be used as image signals amplified in preamplifier 92 and supplied to the driver 94 for grid intensity control of the image display tube 42. Suitable circuits for this purpose and the overall operation of the system are described in the aforementioned copending patent application. Likewise described there are suitable circuits for the deflection preamplifier 96 and driver 98, whereby the output of amplifier 88 may be used to provide an oscilloscope display of that signal. Appropriate gain controls and zero settings for the preamplifiers 92 and 96 specifically adapt a number of different signals supplied for image display or deflection of the tube 42 for their respective purposes.

With a raster scan of the specimen 22 synchronized to the deflection of the display tube 42, which is grid intensity modulated by the atomic number signal Z, a complete image of the specimen in accordance with its atomic number characteristic is provided by the tube 42. This image may be produced at a scanning rate suitable for viewing or at a very slow rate suitable for recording by photography. The supply of the Z signal from the amplifier 86 to a strip chart recorder may be in well-known fashion, with the strip chart operating at a rate calibrated to the time of scan of the specimen and with the deflection of the recording pen appropriately calibrated in a manner hereinafter discussed. The amplitude of the recorded signal on the strip chart corresponds to atomic number, as does the amplitude of the vertical deflection of the tube 42 as produced by the driver 98 in accordance with the atomic number signal. Where the tube 42 is used for displaying an image, the brightness of the image corresponds to the atomic number signal Z as does the density of any photographic emulsion used for recording.

Figure 3:
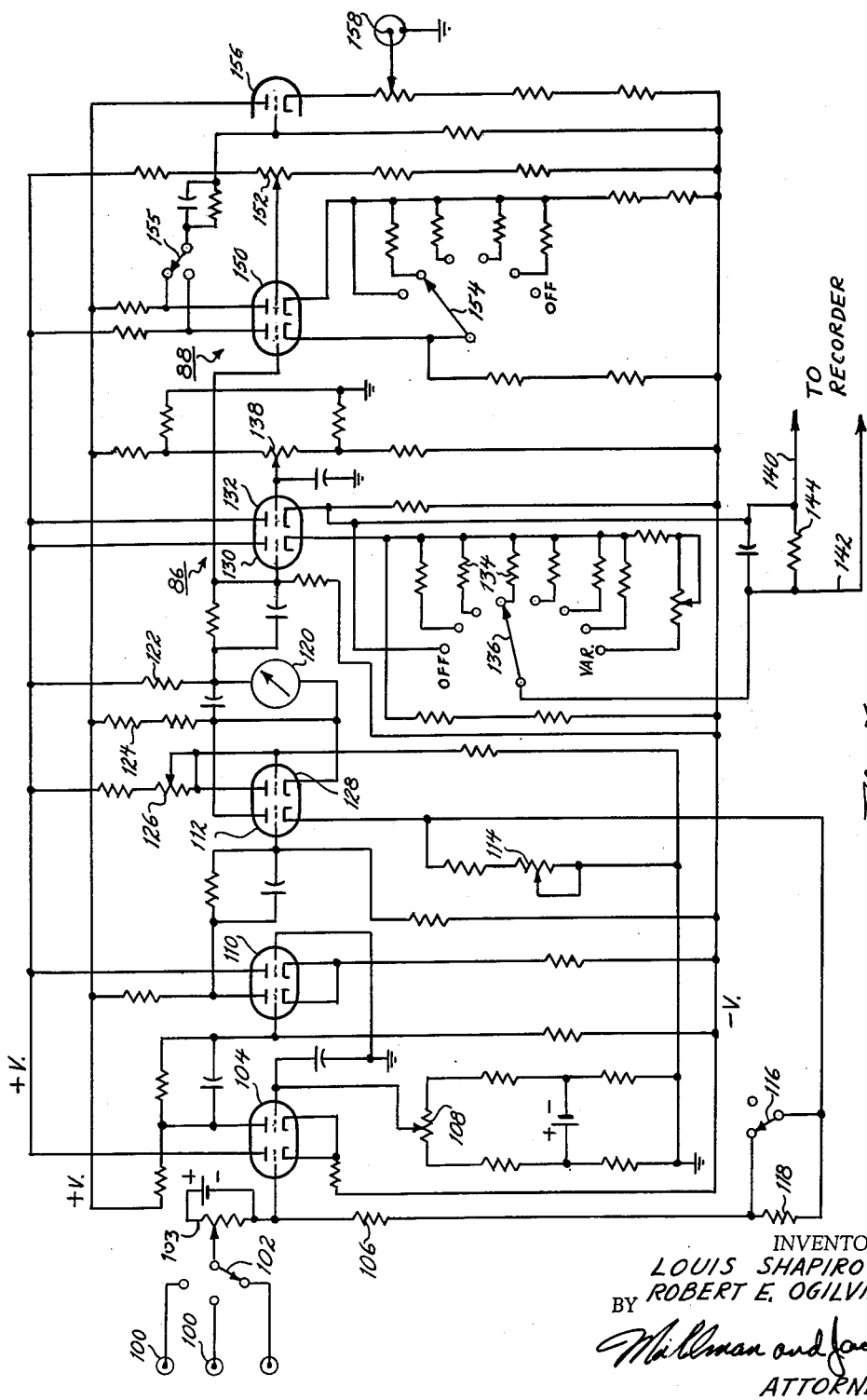
FIG. 3 is a schematic circuit diagram of portions of the block diagram of FIG. 2.

In FIG. 3 circuitry suitable for use with the system of FIG. 2 is shown. Three input terminals 100 are provided which are connected to three electrically isolated portions of the stage 24. With this arrangement, three different specimens 22 may be secured to the isolated portions of the stage 24 and individual electrical connection made to the specimens so that individual tests may thereby be performed by appropriate adjustments of the motors 26 and 28.

A specimen selector switch 102 connects the specimen under test to a biasing potentiometer 103 which applies a suitable positive bias to the specimen. The negative end of the potentiometer 103 is connected to the input of the detecting head which is at the junction of one input of a difference amplifier 104 and one terminal of a sampling resistor 106. The other input of the difference amplifier 104 is adjustably supplied with a voltage via potentiometer 108 for zero setting the meter 120. The output of the difference amplifier 104 is resistor-capacitor coupled to an amplifier 110, also connected as a difference amplifier with its second input at ground. The output of the amplifier 110 is also resistor-capacitor coupled to an amplifier 112 which has its cathode connected to an adjustable cathode resistor 114 returned to ground, and also to a feedback loop via switch 116 to the high voltage end of sampling resistor 106. The switch 116 in the feedback loop bypasses a resistor 118 which may be connected into the feedback loop when the switch 116 is in its other position to increase the sampling resistance and thereby multiply the gain of the overall network. The circuitry of tubes 104, 110, and 112 corresponds to the circuit 76, 78 and preamplifier 82 of FIG. 2.

The anode of the tube 112 is connected directly to one side of the micro-ammeter 120, the other terminal of which is connected to a resistor 122 returned to the positive voltage supply. The anode of tube 112 is also connected to a resistor network 124 returned to a more positive voltage level. Another resistor network 126, connected through the amplifier tube 128 as a diode to the anode of tube 112, protects the meter 120 from signal surges.

The operation of the circuitry of FIG. 3 is essentially on the basis of transmission current ratio; the relationship of that ratio and atomic number is also shown in FIG. 4 using the ordinate scale on the right. The transmission current ratio is in reverse relationship to the reflected current ratio:

$$\frac{I_T}{I_0} = 1 - \frac{I_R}{I_0}$$

In operation, the amplifier tube 112 supplies its anode-cathode current to the meter 120 so that the resistor network 114 in the cathode circuit thereof develops a voltage directly proportional to that anode-cathode current, which voltage becomes a direct measure of the meter reading. The cathode voltage across resistor 114 adds algebraically to the voltage developed by the transmitted or specimen current $I_T$ flowing through sampling resistor 106, with the resultant voltage appearing at the grid of difference amplifier 104. For zero specimen current we would expect the meter 120 to read zero on a transmitted current ratio scale, and we may assume for the moment that the voltage of the cathode of amplifier 112 is also zero as is the voltage across the specimen current sampling resistor 106 at this zero current condition. The potentiometer 108 is also set under this zero current condition so that the error voltage developed at the output anode of difference amplifier 104 is of the proper value to cut off tube 112 and cause meter 120 to read zero. Then under the condition of specimen current appearing, a negative-going voltage is developed across the sampling resistor 106 (i.e. negative-going in reference to the zero-set voltage of potentiometer 108) which causes an error signal to appear at the output anode of amplifier 104. The error voltage, in turn, results in the application of a grid voltage for amplifier 112 to cause the cathode current to flow through resistor 114 to compensate for the voltage produced by the specimen current in sampling resistor 106; that is, the voltage developed by the specimen current in sampling resistor 106 is cancelled by the voltage developed by cathode current in resistor 114. Thus, as the upper end of resistor 106 tries to go negative, as specimen current appears, the lower end of that resistor 106 goes positive by exactly an equal amount to neutralize the effect. Thereby, the feedback loop through the tubes 104, 110, and 112 is effective to produce a proper reading on the meter 120 corresponding to the specimen current supplied to the resistor 106.

In practice, the tube 112 is not operated at cut-off for a zero setting of the meter 120 corresponding to zero specimen current. That is, the resistor 124, connected to a relatively high positive voltage, supplies a small reverse current through the meter 120 and resistor 122 connected to a less positive voltage. Consequently, a corresponding plate current in the tube 112 is required to cause a zero resultant current to flow through the meter 120. The adjustment for this purpose is provided by the setting of the potentiometer 108 which, in turn, provides the proper grid voltage for the current in tube 112 to zero-set the meter 120. The tube 112 is normally on for zero specimen current so that the smallest increment of specimen current in the sampling resistor 106 results at once in an increase of plate current in the tube 112. Thereby, the generally unfavorable condition is avoided of zero specimen current corresponding to the tube 112 being cut off.

The strip chart amplifier 86 includes two cathode followers 130 and 132. The tube 130 receives the atomic number signal developed across the resistor 122 due to meter current via a resistor-capacitor coupling and supplies a cathode follower output through calibrated gain control resistors 134 and selector switch 136. The tube 132 receives its input from potentiometer 138, the setting of which is a zero-set or reference level and supplies its cathode potential to the output 140. The other output 142 is connected to the pole of the selector switch 136 and the output signal is in double-ended form across the resistor 144 between the outputs 140 and 142.

The output amplifier 88 is a difference amplifier 150, one input of which is the atomic number signal developed across the resistor 122, and the other input of which is from the potentiometer 152, the adjustment of which provides a zero setting or reference. Gain control is via selector switch 154 connected between the cathode of one of the difference amplifier tubes and a plurality of calibrated resistors connected to the other cathode. The output of the difference amplifier 150 is derived from the anode of one or the other of the two tubes and supplied via a selector switch 155 selectively connected to one of the tube anodes to a cathode follower 156 and, thereby, to an output connector 158. The output connector 158 is connected, in turn, to the selector switch 90 for connection to one or the other of two preamplifiers 92 and 96. These preamplifiers 92 and 96 also include gain and zero-set adjustments of the type similar to that described for the output amplifier 88. In the overall system of which this atomic number measuring system is a part, various kinds of signals are supplied to the preamplifier 92 and 96 for appropriate driving of the display tube 42. Accordingly, the gain and zero-set adjustments of those preamplifiers adapt the display tube 42 for their different functions.

In operation, the strip chart amplifier 86 operates with a zero setting supplied by the potentiometer 138 through the cathode follower 132 to the output connection 140. Thereby, a reference level is determined around which the specimen current signal from the meter 120 will vary. If the variation in specimen current signal to be recorded is large, proper selection of the gain control resistor 134 with the switch 136 ensures that the varying voltage supplied to the connection 142 represents essentially the full scale drive of the recorder pen. On the other hand, if the variation in specimen current signal of interest is relatively small, selection of a smaller gain-control resistor by the switch 136 permits that small variation to be utilized as a full scale drive at the connection 142 for the recorder pen.

The effect of this arrangement as a means for expanding the scale is explained in connection with FIGS. 4 and 5. In FIG. 4 a graph shows in idealized form the reverse relationship between atomic number of a specimen and the transmitted current ratio as measured, say, by the meter 120, i.e. as one increases, the other decreases. By reversing the connection of the leads 140 and 142 to the strip chart recorder, the direction of signal variation is effectively reversed so that the recording signal may be construed as varying directly with atomic number.

In determining the atomic number measurement of a specimen, elements of an adjacent atomic number are sometimes involved. In this case, the signal difference produced by the elements of adjacent number represents the information desired, and the signal difference is quite small. The total beam current may be about 0.1 of a microampere, and the full scale deflection of the meter 120 may represent 0.1 milli-ampere, which is the primary signal parameter utilized in recording the measurements. For example, to interpret adjacent atomic numbers, readings of the meter 120 might represent, perhaps, only part of a single small division of the meter. Likewise, data of this type appearing on the strip chart or in the form of display tube deflections or display tube variations in brightness (such as would ultimately take the form of a density difference on a photographic emulsion) would likewise suffer from this crowding of information.

In FIG. 4 a particular sample of atomic number range is indicated, and it corresponds to a variation in $I_T$. In order that this variation of $I_T$ may be utilized as a full deflection of the recorder, the entire range of the recording pen traversal is assigned to the increment of the periodic table essentially corresponding to the elements of the atomic numbers 45–50. Thereby, the entire range of 0–100 of the pen reading on a standard calibration strip chart is available for recording of that very small range data. This result is effectuated by determining the center point of the sampling range and the sampling range of interest itself. That is, in FIG. 4 the center of the sampling range is about atomic number 47 or 48, and the range is 5. The setting of the potentiometer 138 determines the center of the sampling range by setting the zero level for the output connection 140. The setting of the gain control switch 136 determines the effective range of the signal to be sampled; that is, the smaller the gain control impedance 134 that is selected, the smaller the sampling range that is used to drive the recording pen over the full scale. Thereby, effectively, the utmost separation between percent reflection or transmission current data for adjacent elements is achieved.

The output amplifier 88 in a similar fashion provides an additional arrangement for selectively expanding the transmitted current ratio scale about a pre-selected center of the sampled range, which is adapted for driving the C.R.T. tube 40. That is, the zero-set 152 provides the center point of the sampled range (i.e. the particular region of the periodic table in which the elements of interest are located), and the gain adjustment 154 provides the setting of the range itself in terms of atomic numbers. The smaller the range to be sampled, the smaller the attenuating resistor selected by switch 154, and the greater the gain supplied for that range, so that full scale expansion is obtained. By connecting the switch 155 to the other anode output of the amplifier 150, the output signal varies in the reverse direction, that is, directly as the reflected current ratio and directly as the atomic number of the specimen.

For the purpose of using the display tube 42 as an oscilloscope, the vertical preamplifier 96 contains additional zero-set and gain control adjustments (as described in the aforementioned copending application) and together with the adjustments of amplifier 88, the deflection display tube 42 operating as an oscilloscope is centered about the center of the sampling range, and full vertical deflection 160 (FIG. 2) is provided for the sampled range with the upper and lower deflection limits for the two ends of the range of the periodic table being sampled.

In FIG. 6 a curve showing a typical relationship between the grid voltage (which determines the beam intensity) applied to the tube 42 and the resulting beam spot brightness is shown; the entire useful range of brightness plotted against grid drive is indicated. The zero-set adjustment of amplifier 88 together with that of preamplifier 92 are such that the brightness corrsponding to the center point (47.5) of the sampled range is in the middle of the grid intensity range (which corresponds approximately to the middle of the brightness range) and the gain of the preamplifier 92 is adjusted to provide full excursion over the useful range of grid intensity for the elements at the ends of the sampled range (atomic numbers 45–50).

The scale expansion provided by the gain and zero-set controls of amplifiers 86 and 88 also tend to provide a linearizing effect on the atomic number graph of FIG. 4. That is, within the limited sampled range, the expanded scale is substantially linear on a qualitative basis.

The specimen current arrangement described thus far has the advantages of relative simplicity and of avoiding the problems of measuring reflected current directly. Thus, special structures are not needed for collecting all of the reflected electrons or for reliably sampling them.

In FIG. 7 a modification of the system of this invention is shown. A biased electron collector in the form of a hemispherical metal shield 170 surrounds the upper part of the specimen surface upon which the electron beam impinges. An aperture 172 in the upper central part of the shield 170 permits the beam to be directed over the specimen surface. The specimen 22 may be positively biased as described before, and the specimen current $I_T$ is obtained. The sampling resistor for $I_T$ may be part of a resistor network that comprises an adder circuit 174. An ammeter 176 represents the measurement of that specimen current. In a similar fashion, a potentiometer 178 provides a suitable negative bias for the shield 170 to assist in repelling secondary and re-diffused electrons. The reflected current $I_R$ is measured by means of a meter 179 and by means of a sampling resistor which is part of the resistor network of adder 174.

With this arrangement the reflected and specimen currents are both measured for the purpose of determining the reflected current ratio. The adder 174 determines the sum of the reflected and specimen currents, and a divider circuit 180 is used to obtain the ratio of the reflected current to the sum of the reflected and specimen currents. The divider, appropriately may be of the form utilizing a known form of multiplier in a feedback loop. Thereby, the output of the divider circuit 180 is the desired reflected current ratio. This signal may be supplied directly to a meter calibrated in atomic number or in average atomic number where more than one element is present for appropriate studies. The scale expansion arrangement described above is also useful in this connection.

With this system the bias supplied to the hemispherical shield 170 determines which range of reflected electron energies will be returned to the specimen for incorporation in the specimen current and which range is to be accepted by the shield 170 for identification as the reflected current. This arrangement provides a considerable flexibility in fine determinations of the reflected specimen currents.

In FIG. 8 another modification of this invention is shown. A circular electrode 190 is biased by means of a potentiometer 178 to provide a repelling charge thereon so that secondary electrons and re-diffused electrons may be repelled. In addition, a second circular electrode 192 is provided which may also be negatively biased to provide an additional control over the energies required for an electron to escape and be collected by the electrode 192. The electrodes 190 and 192 are positioned to surround the beam and operate effectively to prevent the escape of electrons not possessing energies sufficient to pass through the repelling fields presented by them. The lower energy electrons are repelled to the specimen 22, which is effectively un-biased at ground potential. These electrodes 190 and 192 produce high fields such that the sorting of the reflected electrodes may extend well into the energy region of the re-diffused electrons. Thereby, resolution of the electron beam is more precise since the higher energy reflected electrons tend to originate from the small specimen volume directly beneath the point of impact of the electron beam. Different biases may be applied to the electrodes 190 and 192 to collect emitted electrons at different energy levels.

The arrangement of FIG. 8 provides suitable controls whereby the electrons impinging on the collectors 190 and 192 may be respectively measured in current terms by the meters 194 and 179, respectively. The reflected current derived from the electrode 192 may be sampled via resistor 196, and the resulting signals utilized to derive the reflected current ratio in the manner described above for FIG. 7.

The bias of the upper electrode 192 may be varied from an extreme negative voltage in which all reflected electrons are repelled to a voltage that is positive with respect to ground. Thereby, the velocity distribution of these electrons, which is characteristic of the specimen material, may be sampled, and the electrons of different velocities may be sorted.

Alternate methods exist for sampling the reflected electron current $I_R$ directly. For example, the phosphor screen 32 and photomultiplier arrangement of FIG. 1 is appropriate to obtain a sample of the reflected electrons. Direct use of a photomultiplier is also appropriate.

This invention is especially suited for use with the afocal electron optics (or beam former) and deflection system described in the copending patent application of Shapiro and Elion, Serial No. 123,065, filed July 10, 1961. The electron optics and deflection plates described in the latter patent application are relatively far removed from the specimen stage, that is, of the order of several inches. With this large working distance, the specimen is effectively decoupled from the source of the beam; that is, the positive bias on the specimen does not materially or adversely affect the fields controlling the beam-forming and deflection functions, and the specimen bias is essentially independent of them. Moreover, due to this large working distance, it is possible to insert repeller and collector electrodes such as electrodes 170, 190 and 192 in a practical manner.

The atomic number measurements may be effectively recorded photographically as an atomic number image of the specimen, for example, by means of the display tube 40, and this recorded image may usefully be compared with a recorded X-ray image of the specimen displayed at the same time on the display tube 42. The two records may then be usefully compared. This mode of operation is especially desirable where the specimen is an alloy, for the atomic number measurements are averages of the component elements, and each record may complete the information supplied by the other.

The voltage bias of the specimen 22 via its support 24 is maintained substantially constant with respect to a common reference voltage, ground, of the sampling circuitry (FIG. 2) and the electron gun, optics and deflection system 70. In the sampling circuitry, the upper terminal of sampling resistor 106 is maintained constant, e.g. at substantially ground potential (to within the order of a microvolt or less), by the action of the feedback circuit of tubes 104, 110, and 112, which action varies the other end of sampling resistor 106 by the same voltage as that produced by the variations in specimen current. Thus, the bias potential at the top of the potentiometer, connected directly to the specimen via the support 24, is held substantially constant with respect to ground. The specimen may be held at ground with zero bias relative to the sampling circuitry, where a repeller electrode like 190 (FIG. 8) is used to provide the electrostatic field effective to control the emission of electrons; in this case, the specimen current is also sampled by the feedback circuitry of FIG. 3, and the ground potential of the specimen is maintained constant in the manner described.

A proper electrostatic field for controlling the emission of secondary electrons from the specimen is ensured by maintaining a ground potential on the metal walls of the chamber surrounding the biased specimen support. In fact, the metal structures of the column 10 (FIG. 1) and the spaces therein are generally maintained at ground potential; the deflection plates 18 and 20 (and other electrostatic adjustments) are generally operated symmetrically with respect to ground so that the ground plane is unaffected. An electrostatic shield (such as electrode 190) may be used between the specimen and the deflection plates to avoid any adverse field effects, and such a shield or electrode is symmetrically circular with respect to the axis of the column and beam deflection area of the specimen. The field due to the specimen bias has but a negligible deflection effect on the beam itself so that the impingement of the beam is reliably determined.

Accordingly, with this invention the analysis of specimens with an electron beam probe permits the determination of the atomic numbers of elements of the specimens with precision, accuracy, and reliability. The use of specimen current for determining the atomic number of a specimen tends to avoid the limitations of sampling of reflected electrons and ensures a good signal to noise ratio.

What is claimed is:

1. An electron beam analysis system comprising means for directing an electron beam to a specimen, means for biasing the specimen and for deriving a signal in accordance with specimen current produced by said electron beam, and means for producing from said derived signal another signal proportion to the ratio of reflected electron current to electron beam current.

2. An electron beam analysis system as recited in claim 1 wherein said signal producing means includes means for deriving a signal proportional to reflected electron current, and divider means for producing said ratio signal from said reflected electron and specimen currents.

3. An electron beam analysis system as recited in claim 1 wherein said signal producing means includes means for setting the zero-signal value of said another signal to produce said ratio signal.

4. An electron beam analysis system as recited in claim 1 and further comprising means for displaying atomic number values in accordance with said ratio signal over a certain range, means for setting the direct level of said ratio signal to determine the atomic number region in which said ratio signal is to vary, means for amplifying said ratio signal to determine the range of atomic numbers presented by said display means, and means for supplying the output of said level setting and said amplifying means to said display means.

5. An electron beam analysis system as recited in claim 4 wherein said display means includes a recorder.

6. An electron beam analysis system as recited in claim 4 wherein said display means includes means for producing deflections in accordance with values of said ratio signal.

7. An electron beam analysis system as recited in claim 4 wherein said display means includes a cathode ray tube for producing an image of said specimen in accordance with said atomic number values.

8. An electron beam analysis system comprising means for directing an electron beam to a specimen, means for supplying a large bias to said specimen to prevent the escape of low energy electrons but not of high energy reflected electrons, and means for deriving an atomic number signal in accordance with the current transmitted by the specimen.

9. An electron beam analysis system as recited in claim 8 wherein said atomic number signal means includes means for deriving a signal in accordance with said transmitted current, and means for amplifying and for setting a zero reference level for said transmitted current signal.

10. An electron beam analysis system as recited in claim 8 wherein said means for deriving an atomic number signal includes means for expanding the scale of said atomic number signal about an intermediate value thereof.

11. An electron beam analysis system comprising means for removably supporting different specimens to be analyzed, means for producing a high energy electron beam and for directing said beam to irradiate a specimen at said supporting means, to stimulate the emission of X-rays characteristic of said specimens and the emission of electrons, means for deriving electrical signals in accordance with said X-rays, means for biasing said specimens to prevent the escape of low energy electrons and for deriving atomic number representative signals in accordance with the current transmitted by said specimens, scanning means for producing images in accordance with said derived X-ray and atomic number signals, and means for deflecting said electron beam and for operating said scanning means in synchronism.

12. An electron beam analysis system comprising means for directing an electron beam to a specimen, means arranged to be connected to said specimen for leaving said specimen substantially unbiased and for deriving a signal in accordance with specimen current produced by said beam, electrode means for repelling electrons emitted from said specimen below a certain energy level and for deriving a signal from emitted electrons above said energy level, and means for producing an atomic number signal from said specimen current signal and said reflected electron signal.

13. An electron beam analysis system as recited in claim 12 wherein said means for producing an atomic number signal includes means for adding said specimen and reflected electron signals and for dividing the sum thereof into one of the other of said signals.

14. An electron beam analysis system as recited in claim 11 wherein said means for producing an electron beam and for directing said beam to a specimen includes an afocal electron optical system spaced from the specimen so as to be substantially unaffected by the baising of the specimen.

15. An electron beam analysis system comprising means for directing an electron beam to a specimen, and means for biasing the specimen and for deriving a signal in accordance with specimen current produced by said beam including a sampling impedance having a terminal to receive said specimen current, and means for deriving an atomic number signal from the voltage at said impedance terminal and including a feedback circuit for receiving the voltage at said impedance terminal and for maintaining the terminal voltage substantially constant.

16. An electron beam analysis system as recited in claim 15 wherein said biasing means includes means for supplying a biasing voltage to the specimen with respect to the voltage at said impedance terminal.

17. An electron beam analysis system as recited in claim 16 wherein said biasing voltage supplying means includes a potentiometer and means for connecting said potentiometer between the specimen and said impedance terminal.

18. An electron beam analysis system as recited in claim 15 wherein said means for deriving an atomic number signal includes a meter circuit connected to said feedback circuit, said feedback circuit including means for adjusting current in said feedback circuit for a zero-level specimen current signal to provide a zero setting for said meter circuit.

19. An electron beam analysis system as recited in claim 15 wherein said means for deriving an atomic number signal includes means for deriving a signal from said feedback circuit, means for setting an intermediate reference signal level, and adjustable means for variably amplifying the signal derived from said feedback circuit about said reference level.

20. An electron beam analysis system comprising a specimen support, means for directing an electron beam to a specimen at said support, and means for providing an electrostatic field to repel electrons of a certain energy level from the specimen, and for sampling the electron current produced by the beam, said field providing and sampling means including an impedance having a terminal for connection to said support to receive said specimen current and providing a field determining voltage level, and means for deriving an atomic number signal from the specimen current received by said impedance and including means for maintaining said voltage level substantially constant.

21. An electron beam analysis system as recited in claim 20 wherein said means for providing an electrostatic field further includes means spaced from said specimen support for providing a field determining voltage.

22. An electron beam analysis system as recited in claim 20 wherein said means for maintaining said voltage level substantially constant includes a feedback circuit for maintaining the voltage across said impedance substantially constant.

References Cited in the file of this patent

UNITED STATES PATENTS

| | | |
|---|---|---|
| 2,330,930 | Snyder | Oct. 5, 1943 |
| 2,901,627 | Wiskott et al. | Aug. 25, 1959 |
| 2,982,814 | Fine et al. | May 2, 1961 |

OTHER REFERENCES

"Using Electrons for Microanalysis," by Dr. V. K. Zworykin, Science, April 28, 1944, vol. 99, No. 2574, pp. 334–335.

"A Scanning Electron Microscope," by V. K. Zworykin et al., ASTM Bulletin, August 1942, pp. 15–23.

"X-Ray Microscopy and Microradiography," by Cosslett, Engstrom, and Pattee, Academic Press, Inc., 1957, New York (Proceedings of a Symposium held at the Cavendish Laboratory, Cambridge England, August 1956), pp. 374 to 380.